US009718937B2

(12) United States Patent
Dai et al.

(10) Patent No.: US 9,718,937 B2
(45) Date of Patent: Aug. 1, 2017

(54) INHERENT FLAME RETARDANT RIGID POLYURETHANE FOAM

(71) Applicant: XIAMEN UNIVERSITY, Xiamen (CN)

(72) Inventors: Lizong Dai, Xiamen (CN); Cong Xie, Xiamen (CN); Wei'ang Luo, Xiamen (CN); Birong Zeng, Xiamen (CN); Yiting Xu, Xiamen (CN); Xinyu Liu, Xiamen (CN); Kaibin He, Xiamen (CN); Qi Li, Xiamen (CN); Yuanyuan Li, Xiamen (CN); Xianming Chen, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 0 days.

(21) Appl. No.: 15/125,378

(22) PCT Filed: Dec. 5, 2014

(86) PCT No.: PCT/CN2014/093079
§ 371 (c)(1),
(2) Date: Sep. 12, 2016

(87) PCT Pub. No.: WO2015/135348
PCT Pub. Date: Sep. 17, 2015

(65) Prior Publication Data
US 2017/0073488 A1 Mar. 16, 2017

(30) Foreign Application Priority Data
Mar. 14, 2014 (CN) .......................... 2014 1 0096334

(51) Int. Cl.
| C08J 9/00 | (2006.01) |
| C08G 18/48 | (2006.01) |
| C08G 18/66 | (2006.01) |
| C08G 18/38 | (2006.01) |
| C08G 18/18 | (2006.01) |
| C08G 18/24 | (2006.01) |
| C08J 9/12 | (2006.01) |
| C08G 101/00 | (2006.01) |

(52) U.S. Cl.
CPC ............ *C08J 9/0038* (2013.01); *C08G 18/18* (2013.01); *C08G 18/1825* (2013.01); *C08G 18/242* (2013.01); *C08G 18/3878* (2013.01); *C08G 18/4883* (2013.01); *C08G 18/6696* (2013.01); *C08J 9/0014* (2013.01); *C08J 9/0023* (2013.01); *C08J 9/0028* (2013.01); *C08J 9/0052* (2013.01); *C08J 9/0061* (2013.01); *C08J 9/0095* (2013.01); *C08J 9/125* (2013.01); *C08G 2101/0025* (2013.01); *C08G 2101/0083* (2013.01); *C08J 2201/022* (2013.01); *C08J 2203/10* (2013.01); *C08J 2205/10* (2013.01); *C08J 2375/08* (2013.01); *C08J 2483/00* (2013.01); *C08J 2483/12* (2013.01)

(58) Field of Classification Search
CPC .. C08G 18/18; C08G 18/1825; C08G 18/242; C08G 18/3878; C08G 18/4883; C08G 18/6696; C08G 2101/0025; C08G 2101/0083; C08J 9/0014; C08J 9/0023; C08J 9/0028; C08J 9/0038; C08J 9/0052; C08J 9/0061; C08J 9/0095; C08J 9/125; C08J 2201/022; C08J 2203/10; C08J 2205/10; C08J 2375/08; C08J 2483/00; C08J 2483/12
See application file for complete search history.

(56) References Cited

U.S. PATENT DOCUMENTS

| 4,499,221 | A | * | 2/1985 | Saitoh | ............... | C08L 75/04 524/109 |
| 4,742,088 | A | | 5/1988 | Kim | | |
| 8,648,154 | B2 | * | 2/2014 | Kong | ............... | C08G 8/28 525/153 |
| 2009/0048377 | A1 | * | 2/2009 | Kanno | ............... | C08K 5/0066 524/117 |
| 2014/0343183 | A1 | * | 11/2014 | Gaan | ............... | C07F 9/657181 521/170 |
| 2016/0068663 | A1 | * | 3/2016 | Sakurai | ............... | C08L 101/00 524/127 |

FOREIGN PATENT DOCUMENTS

| CN | 101376665 A | 3/2009 |
| CN | 101962474 A | 2/2011 |
| CN | 102875762 A | 1/2013 |
| CN | 103694434 A | 4/2014 |
| CN | 103833947 A | 6/2014 |
| CN | 103833950 A | 6/2014 |
| CN | 103865025 A | 6/2014 |
| JP | 2011236284 A | 11/2011 |
| TW | 201022313 A | 6/2010 |

* cited by examiner

*Primary Examiner* — John Cooney
(74) *Attorney, Agent, or Firm* — Rabin & Berdo, P.C.

(57) ABSTRACT

The present invention provides a kind of inherent flame retardant rigid polyurethane foam. The production formula comprises 100 to 105 pbw of polyether polyol and reactive phosphorus-containing flame retardant, 2.5 to 3.5 pbw of amine catalyst, 0.8 to 2.5 pbw of tertiary amine catalyst, 0.8 to 2.5 pbw of foam stabilizer, 0.5 to 1.5 pbw of blowing agent, 135 to 150 pbw of isocyanates, and 0.05 to 0.1 pbw of organo-metallic catalyst, wherein the reactive phosphorus-containing flame retardant is 9,10-dihydro-9-oxa-10-phosphaphenanthrene-4-hydroxybenzyl alcohol. The active monomers containing flame retarding elements are introduced into main chain and side chain of PU for modification, which permanently improves the flame retardancy of PU without obvious effect on other performance of PU matrix.

9 Claims, 2 Drawing Sheets

INHERENT FLAME RETARDANT RIGID POLYURETHANE FOAM

FIELD OF THE INVENTION

The present invention relates to a kind of foam, especially to a kind of flame retardant of rigid polyurethane foam.

BACKGROUND OF THE INVENTION

Polyurethane (PU) is one of the six most important synthetic materials and widely used in the fields of buildings with energy conservation, transportation industry including auto, metro or high-speed rail and new energy. Recently, research on flame retardancy of rigid polyurethane foam is paid much attention because of serious fire accidents. Therefore, it is of great urgency to improve the flame class of rigid polyurethane foam without obviously subdued effect on other performance.

Chinese patent application No. CN101962474A discloses a kind of environment-friendly and high flame retardancy rigid polyurethane foam produced by reaction among polyether polyol, pentane, flame retardant, modified hollow microsphere and polyisocyanate in the presence of foam stabilizer and/or catalyst, which is well used for heat preservation of building exterior, plumbing and refrigerating apparatus as vertical combustion meeting the requirement of V-0 grade. Another Chinese patent application No. CN102875762A discloses a kind of high flame retardancy rigid polyurethane foam using composited flame retardant with the limiting oxygen index value being over 30. This kind of rigid polyurethane foam has high flame retardancy, low smokiness and high fireproof heat insulation, which is safe to use. It can be seen that the existing flame-retardant technology of rigid polyurethane foam is focused on adding flame retardant, which is of low cost, quick recycling and great promising application.

However, the adding-type flame-retardant technology has some problems: (1) high adding amount of flame retardant for reaching a certain of desirable flame retard effect; (2) poor compatibility with polyurethane matrix with the result that additive may migrate to the surface of material.

SUMMARY OF THE INVENTION

The objective of the present invention is to provide a kind of inherent flame retardant rigid polyurethane foam to overcome the disadvantages of the existing PU material and its flame retardant technology.

The technical proposal of the present invention is that:

The production formula of the synthesized inherent flame retardant rigid polyurethane foam comprises:

(A) 100 to 105 pbw of polyether polyol and reactive phosphorus-containing flame retardant, (B) 2.5 to 3.5 pbw of amine catalyst, (C) 0.8 to 2.5 pbw of tertiary amine catalyst, (D) 0.8 to 2.5 pbw of foam stabilizer, (E) 0.5 to 1.5 pbw of blowing agent, (F) 135 to 150 pbw of isocyanates, and (G) 0.05 to 0.1 pbw of an organo-metallic catalyst; wherein the reactive phosphorus-containing flame retardant is 9,10-dihydro-9-oxa-10-phosphaphenanthrene-4-hydroxybenzyl alcohol (DOPO-HB).

The preparation of DOPO-HB has been reported by Liu (seen in flame-retardant epoxy resins from novel phosphorus-containing novolac. Polymer(2001), 42(8), 3445-3454.). The synthesization equation is shown as follow.

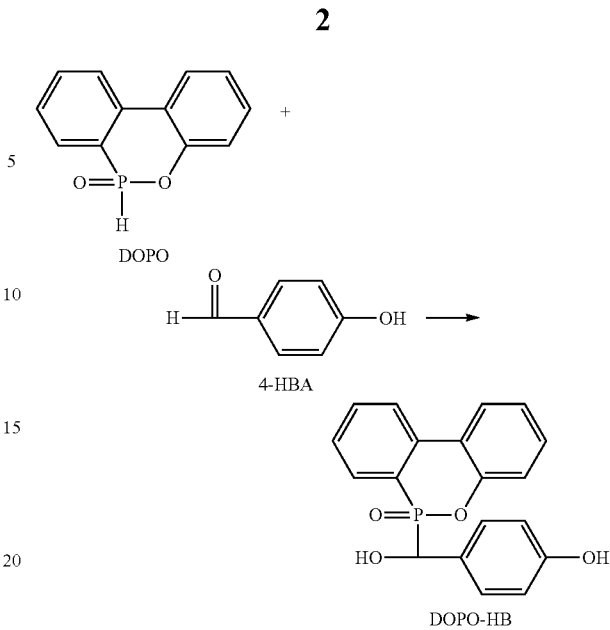

In a preferred embodiment, the weight ration of the polyether polyol and the reactive phosphorus-containing flame retardant is 10 to 90:10 to 90.

In a preferred embodiment, the polyether polyol is applicable to rigid polyurethane foam.

In a preferred embodiment, the amine catalyst is triethylenediamine.

In a preferred embodiment, the tertiary amine catalyst is 2,4,6-tris(dimethylaminomethyl)phenol.

In a preferred embodiment, the foam stabilizer is silicon-carbide-bond foam stabilizer.

In a preferred embodiment, the blowing agent is water.

In a preferred embodiment, the viscosity of the isocyanates is 150 to 250 mPa·s, and the isocyanates has a NCO content of 30.0 wt % to 32.0 wt %.

In a preferred embodiment, the organo-metallic catalyst is dibutyltin dilaurate.

The method for preparing the inherent flame retardant rigid polyurethane foam as mentioned comprises the steps of:

1) mixing reactive phosphorus-containing flame retardant, polyether polyol, amine catalyst, foam stabilizer, tertiary amine catalyst and blowing agent together to obtain component A;

2) mixing isocyanates and organo-metallic catalyst together to obtain component B;

3) adding component B into component A, pouring the mixture into mould, then foaming, curing and then demoulding to produce the inherent flame retardant rigid polyurethane foam mentioned above.

A series of inherent flame retardant rigid polyurethane foams with different phosphorus content are prepared by changing the dosage proportion of polyether polyol and DOPO-HB.

Comparing with the existing technology, the advantages of present invention are:

1. Both DOPO-HB and polyether polyol are hydroxyl-terminated alcohols, so that DOPO-HB is able to realize the functionality of polyether polyol. The flame retarding elements are introduced into the molecular chain between oxhydryl active sites, which makes the resultant compound having both flame retardance of inorganics and plasticity of organics.

2. DOPO groups with super flame retardance are introduced into reticular formation of PU by creating covalent bonds, which overcomes the disadvantages of traditional adding flame retardant. For example, the traditional adding flame retardant is incompatible with PU matrix and may migrate to the surface over time. Moreover, the adding amount of reactive flame retardant in the present invention is greatly reduced comparing with existing technology.

3. The active monomers containing flame retarding elements are introduced into main chain and side chain of PU for modification, which permanently improves the flame retardancy of PU without obvious effect on other performance of PU matrix.

DETAILED DESCRIPTION OF THE EMBODIMENTS

The present invention will be further described with the drawings and the embodiments.

Figure 1:
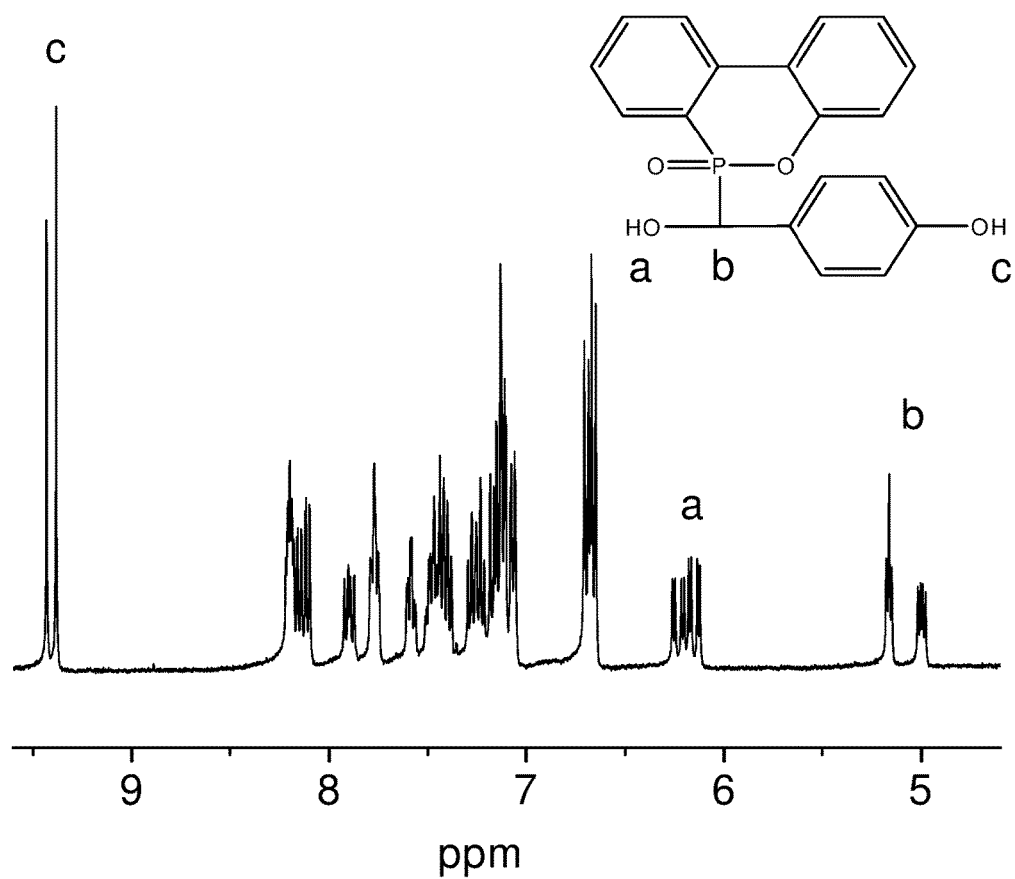
FIG. 1 illustrates a $^1$H NMR spectroscopy of reactive phosphorus-containing flame retardant (DOPO-HB) of the present invention.
Figure 2:
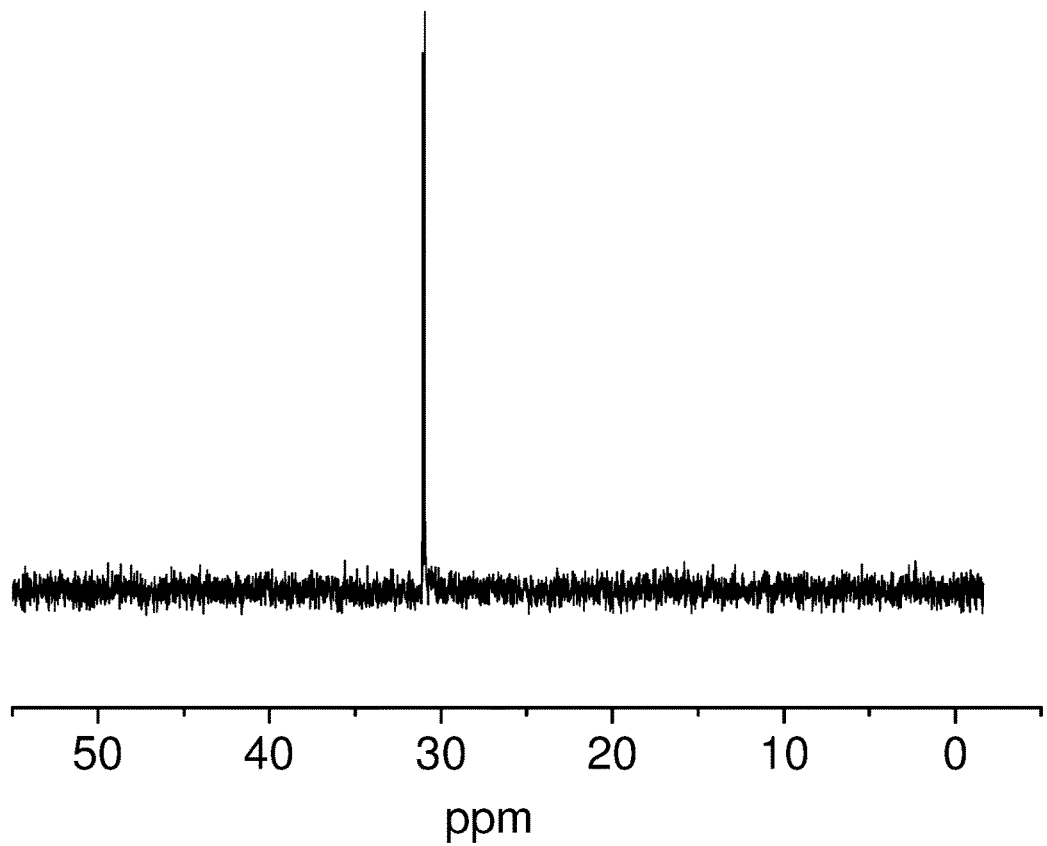
FIG. 2 illustrates a $^{31}$P NMR spectroscopy of reactive phosphorus-containing flame retardant (DOPO-HB) of the present invention.

The $^1$H and $^{31}$P NMR spectroscopy of DOPO-HB of the following embodiments refers to FIG. 1 and FIG. 2 respectively. $^1$H NMR (ppm, DMSO-$d_6$), δ=4.97~5.18 (1H, H$^b$), 6.11~6.27 (1H, H$^a$), 6.64~8.22 (12H, Ar—H), 9.39~9.43 (1H, if). $^{31}$P NMR (ppm, DMSO-$d_6$), δ=31.0.

The polyether polyol applicable to rigid polyurethane foam of the following embodiments is sucrose polyether polyol with a droxyl value of 441 mgKOH/g, and the isocyanates is made of Wanhua Chemical Group Co. Ltd of which the model is PM-100 with viscosity of 150~250 mPa·s and NCO content of 30.0 wt %~32.0 wt %.

Embodiment 1

Embodiment 1 is a contrast embodiment without adding reactive phosphorus-containing flame retardant.

105 g sucrose polyether polyol, 3.5 g triethylenediamine, 2.5 g silicon-carbide-bond foam stabilizer, 2.5 g 2,4,6-tris(dimethylaminomethyl)phenol and 1.5 g water are mixed together under high-speed stirring to obtain component A. Component B consisting of 150 g PM-100 and 0.1 g dibutyltin dilaurate is added into component A under high-speed stirring for uniform mixing. The mixture is poured into self-made mould for foaming as soon as it turns white. And after the processes of curing for 48 hours and demoulding, the rigid polyurethane foam with an oxygen index of 17.0 according to GB/T 2406.1-2008 standard is obtained.

Embodiment 2

90 g sucrose polyether polyol, 10 g DOPO-HB, 2.5 g triethylenediamine, 0.8 g silicon-carbide-bond foam stabilizer, 0.8 g 2,4,6-tris(dimethylaminomethyl)phenol and 0.5 g water are mixed together under high-speed stirring to obtain component A. Component B consisting of 135 g PM-100 and 0.05 g dibutyltin dilaurate is added into component A at room temperature under high-speed stirring of 2500 r/min for uniform mixing. The mixture is poured into self-made mould for foaming as soon as it turns white. And after the processes of curing for 48 hours and demoulding, the rigid polyurethane foam with an oxygen index of 18.0 according to GB/T 2406.1-2008 standard is obtained.

Embodiment 3

80 g sucrose polyether polyol, 20 g DOPO-HB, 3.0 g triethylenediamine, 1.7 g silicon-carbide-bond foam stabilizer, 1.7 g 2,4,6-tris(dimethylaminomethyl)phenol and 1.0 g water are mixed together under high-speed stirring to obtain component A. Component B consisting of 142 g PM-100 and 0.08 g dibutyltin dilaurate is added into component A at room temperature under high-speed stirring of 2500 r/min for uniform mixing. The mixture is poured into self-made mould for foaming as soon as it turns white. And after the processes of curing for 48 hours and demoulding, rigid polyurethane foam with an oxygen index of 19.5 according to GB/T 2406.1-2008 standard is obtained.

Embodiment 4 to 10

The method for preparing inherent flame retardant rigid polyurethane foam of embodiment 4 to 10 is similar to embodiment 1. A series of inherent flame retardant rigid polyurethane foam with different phosphorus content are prepared by changing the dosage proportion of polyether polyol and DOPO-HB, wherein the dosage proportions of polyether polyol and DOPO-HB of embodiment 4 to 10 is presented on the following sheet:

|  | Sucrose polyether polyol | DOPO-HB | Limiting oxygen index |
|---|---|---|---|
| Embodiment 4 | 70 g | 30 g | 21.5 |
| Embodiment 5 | 60 g | 40 g | 23.5 |
| Embodiment 6 | 50 g | 50 g | 25.5 |
| Embodiment 7 | 40 g | 30 g | 27.5 |
| Embodiment 8 | 30 g | 70 g | 29.5 |
| Embodiment 9 | 20 g | 80 g | 31.5 |
| Embodiment 10 | 10 g | 90 g | 33.5 |

Although the present invention has been described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

INDUSTRIAL APPLICABILITY

Both DOPO-HB and polyether polyol are hydroxyl-terminated alcohols, so that DOPO-HB is able to realize the functionality of polyether polyol. The flame retarding elements are introduced into the molecular chain between oxhydryl active sites, which makes the resultant compound having both flame retardance of inorganics and plasticity of organics.

What is claimed is:

1. An inherent flame retardant rigid polyurethane foam synthesized from raw materials comprising:
(A) 100 to 105 pbw of polyether polyol and a reactive phosphorus-containing flame retardant, (B) 2.5 to 3.5 pbw of an amine catalyst, (C) 0.8 to 2.5 pbw of a tertiary amine catalyst, (D) 0.8 to 2.5 pbw of a foam stabilizer, (E) 0.5 to 1.5 pbw of a blowing agent, (F) 135 to 150 pbw of isocyanates, and (G) 0.05 to 0.1 pbw of an organo-metallic catalyst; wherein the reactive phosphorus-containing flame retardant is 9,10-dihydro-9-oxa-10-phosphaphenanthrene-4-hydroxybenzyl alcohol.

2. The inherent flame retardant rigid polyurethane foam according to claim 1, wherein the weight ration of the polyether polyol and the reactive phosphorus-containing flame retardant is 10 to 90:10 to 90.

3. The inherent flame retardant rigid polyurethane foam according to claim 1, wherein the polyether polyol is applicable to rigid polyurethane foam.

4. The inherent flame retardant rigid polyurethane foam according to claim 1, wherein the amine catalyst is triethylenediamine.

5. The inherent flame retardant rigid polyurethane foam according to claim 1, wherein the tertiary amine catalyst is 2,4,6-tris(dimethylaminomethyl)phenol.

6. The inherent flame retardant rigid polyurethane foam according to claim 1, wherein the foam stabilizer is silicon-carbide-bond foam stabilizer.

7. The inherent flame retardant rigid polyurethane foam according to claim 1, wherein the blowing agent is water.

8. The inherent flame retardant rigid polyurethane foam according to claim 1, wherein the viscosity of the isocyanates is 150 to 250 mPa·s, and the isocyanates has a NCO content of 30.0 wt % to 32.0 wt %.

9. The inherent flame retardant rigid polyurethane foam according to claim 1, wherein the organo-metallic catalyst is dibutyltin dilaurate.

* * * * *